US012717308B2

(12) United States Patent
Nakai

(10) Patent No.: US 12,717,308 B2
(45) Date of Patent: Aug. 25, 2026

(54) CONTROL DEVICE AND MACHINE TOOL CONTROL METHOD

(71) Applicant: Mitsubishi Electric Corporation, Tokyo (JP)

(72) Inventor: Yuki Nakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/108,181

(22) PCT Filed: Mar. 6, 2023

(86) PCT No.: PCT/JP2023/008263

§ 371 (c)(1),
(2) Date: Mar. 3, 2025

(87) PCT Pub. No.: WO2024/184991

PCT Pub. Date: Sep. 12, 2024

(65) Prior Publication Data

US 2026/0003344 A1 Jan. 1, 2026

(51) Int. Cl.
*G05B 19/416* (2006.01)

(52) U.S. Cl.
CPC .................... *G05B 19/4166* (2013.01); *G05B 2219/49103* (2013.01)

(58) Field of Classification Search
None
See application file for complete search history.

(56) References Cited

U.S. PATENT DOCUMENTS 6,190,098 B1 2/2001 Fujita et al.
2004/0153199 A1* 8/2004 Sagasaki ............ G05B 19/4067 700/169
2015/0261214 A1 9/2015 Maseki et al.
2020/0341456 A1 10/2020 Ota

FOREIGN PATENT DOCUMENTS

CN 104914789 A 9/2015
JP H05-000388 A 1/1993
JP H06-198566 A 7/1994
JP H07-171731 A 7/1995
JP H11-300578 A 11/1999

(Continued)

OTHER PUBLICATIONS

Decision of refusal issued Dec. 13, 2025 in Chinese Patent Application No. 202380074045.0, 12 pages.

(Continued)

*Primary Examiner* — Ryan A Jarrett
(74) *Attorney, Agent, or Firm* — XSENSUS LLP

(57) ABSTRACT

A control device that causes multiple systems included in a machine tool to operate independently of each other according to NC programs, which are multiple machining programs associated with the multiple respective systems, includes a shaft feeding speed determination unit that adjusts a feed shaft moving speed of a speed-adjusted system when one of the multiple systems is set as a system under monitoring, where the speed-adjusted system is a system other than the system that has been set as the system under monitoring.

7 Claims, 4 Drawing Sheets

(56) References Cited

FOREIGN PATENT DOCUMENTS

| | | | |
|---|---|---|---|
| JP | 2002-273601 | A | 9/2002 |
| JP | 2005-205517 | A | 8/2005 |
| JP | 2008-036804 | A | 2/2008 |
| JP | 2016-062175 | A | 4/2016 |
| JP | 2018-202560 | A | 12/2018 |
| JP | 2019-042865 | A | 3/2019 |
| JP | 2020-181311 | A | 11/2020 |

OTHER PUBLICATIONS

Office Action issued Jul. 31, 2025 in Chinese Patent Application No. 202380074045.0, 12 pages.
International Search Report and Written Opinion mailed on May 23, 2023, received for PCT Application PCT/JP2023/008263, filed on Mar. 6, 2023, 9 pages including English Translation.
Notice of Reasons for Refusal mailed on Oct. 3, 2023, received for JP Application 2023-546557, 15 pages including English Translation.
Decision to Grant a Patent mailed on Jan. 30, 2024, received for JP Application 2023-546557, 5 pages including English Translation.

* cited by examiner

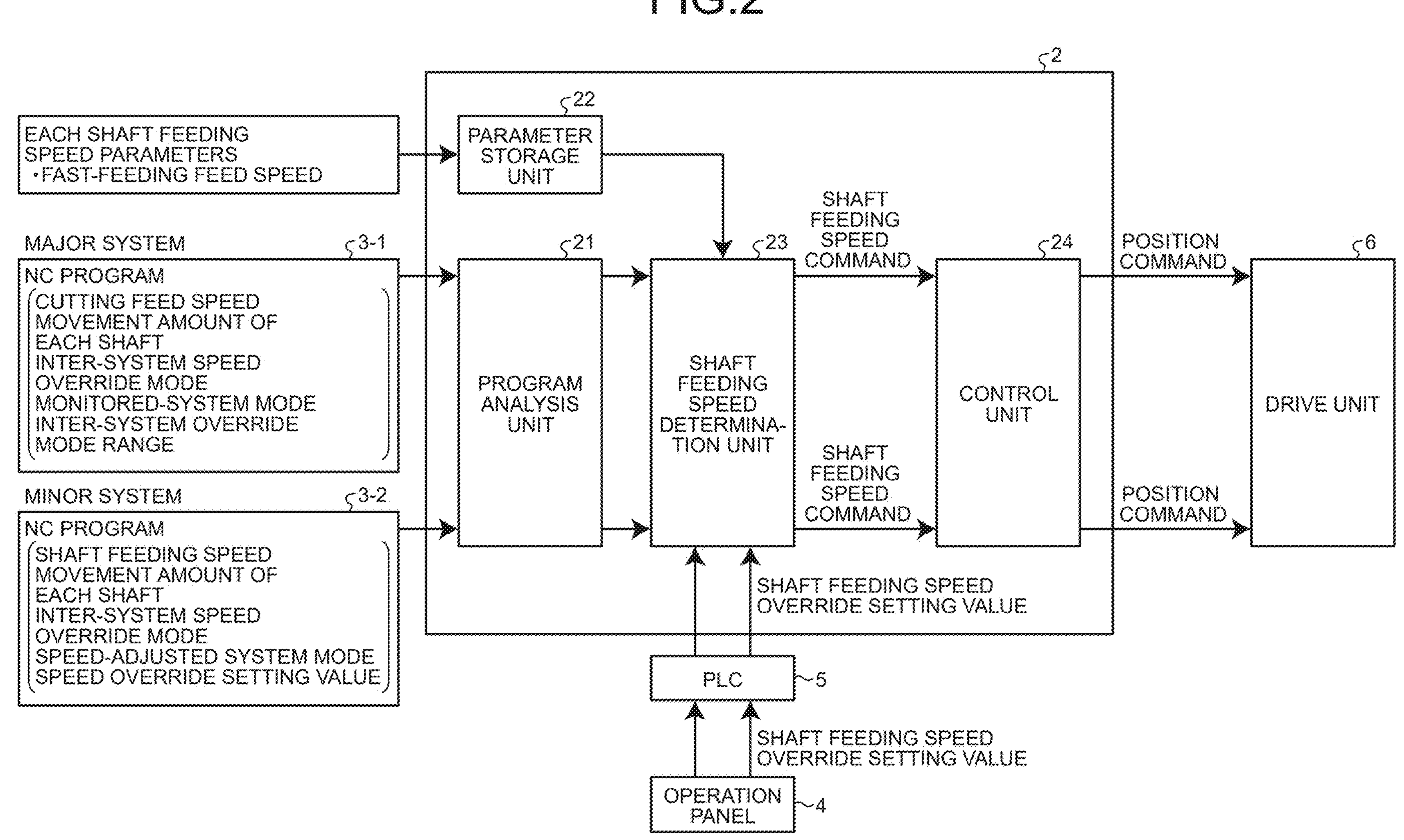
FIG.2
EACH SHAFT FEEDING SPEED PARAMETERS
•FAST-FEEDING FEED SPEED
MAJOR SYSTEM
3-1
NC PROGRAM
CUTTING FEED SPEED
MOVEMENT AMOUNT OF EACH SHAFT
INTER-SYSTEM SPEED OVERRIDE MODE
MONITORED-SYSTEM MODE
INTER-SYSTEM OVERRIDE MODE RANGE
MINOR SYSTEM
3-2
NC PROGRAM
SHAFT FEEDING SPEED
MOVEMENT AMOUNT OF EACH SHAFT
INTER-SYSTEM SPEED OVERRIDE MODE
SPEED-ADJUSTED SYSTEM MODE
SPEED OVERRIDE SETTING VALUE
2
22
PARAMETER STORAGE UNIT
21
PROGRAM ANALYSIS UNIT
23
SHAFT FEEDING SPEED DETERMINATION UNIT
SHAFT FEEDING SPEED COMMAND
SHAFT FEEDING SPEED COMMAND
24
CONTROL UNIT
POSITION COMMAND
POSITION COMMAND
6
DRIVE UNIT
SHAFT FEEDING SPEED OVERRIDE SETTING VALUE
5
PLC
SHAFT FEEDING SPEED OVERRIDE SETTING VALUE
4
OPERATION PANEL

FIG.3

```
N01 G28 V0;
N02 G28 U0 W0;
N03 T0303;
N04 G0 Z10. X75.;        :APPROACH FINISH MACHINING POINT
N05 M101;                :WAIT WITH LOADER SYSTEM (THIRD SYSTEM)
N06 G177 P1;             :START INTER-SYSTEM SPEED OVERRIDE MODE
•                          P1:MONITORED-SYSTEM MODE
N07 G1 ···
•
•
•
N15 G0 Z10. X75.;        :MOVE ASIDE
N16 G177 P0;             :END INTER-SYSTEM SPEED OVERRIDE MODE
•
•
M30;
```

FIG.4

```
•
•
•
•
N05 M101;                :WAIT WITH MAIN SYSTEM (FIRST SYSTEM)
N06 G177 P2 J1 D20;      :START INTER-SYSTEM SPEED OVERRIDE MODE
                           P2:SPEED-ADJUSTED SYSTEM MODE
                           J1:MONITOR FIRST SYSTEM
                              *MULTIPLE SYSTEMS CAN BE SPECIFIED
                           D20:OVERRIDE AT 20%
N07 G0 ···;              (OPERATE WITH FAST-FEEDING FEED SPEED×20%)
N08 G1 ···;              (OPERATE WITH COMMANDED FEED SPEED×20%)
•
N16 G0 ···;              (OPERATE WITH FAST-FEEDING FEED SPEED×100%)
•
N19 G177 P0;             :END INTER-SYSTEM SPEED OVERRIDE MODE
•
•
M30;
```

CONTROL DEVICE AND MACHINE TOOL CONTROL METHOD

CROSS-REFERENCE TO RELATED APPLICATION

This application is a national stage application, pursuant to 35 U.S.C. § 371, of International Patent Application No. PCT/JP2023/008263, filed Mar. 6, 2023, the entire contents of which are incorporated herein by reference.

FIELD

The present disclosure relates to a control device for controlling a machine tool including multiple systems and to a machine tool control method.

BACKGROUND

A numerical control device is a device that controls operation of a machine tool according to a machining program. In a machine tool, vibration of components of the machine tool and the like may affect machining accuracy. For example, Patent Literature 1 discloses a technology of synchronizing a spindle rotational speed command signal with a feed speed command signal to reduce or prevent chatter vibration caused by resonance of a tool attached to the machine tool and the workpiece. The technology disclosed in Patent Literature 1 changes the spindle rotational speed command signal in synchronization with a change in the feed speed command signal when the feed speed command signal changes,

CITATION LIST

Patent Literature

Patent Literature 1: Japanese Patent Application Laid-open No. H11-300578

SUMMARY OF INVENTION

Problem to be Solved by the Invention

However, according to the foregoing conventional technology, in machining using a machine tool including multiple systems, when machining is performed in one system, vibration may be caused by movement of a feed shaft in another system. This may reduce machining accuracy in the one system. Vibration significantly affects machining accuracy particularly in machining that requires high machining accuracy such as finish machining.

The present disclosure has been made in view of the foregoing, and it is an object of the present disclosure to provide a control device that enables a machine tool including multiple systems to reduce an effect due to operation of another system to be exerted on operation of one system that executes a machining command, resulting in improvement of machining accuracy.

Means to Solve the Problem

In order to solve the above-described problems and achieve the object, a control device according to the present disclosure is a control device that causes a plurality of systems included in a machine tool to operate independently of each other according to a plurality of machining programs associated with the plurality of respective systems. The control device includes a shaft feeding speed determination unit to adjust a feed shaft moving speed of a speed-adjusted system when one of the plurality of systems is set as a system under monitoring, the speed-adjusted system being another one of the systems other than the system that has been set as the system under monitoring.

Effects of the Invention

A control device according to the present disclosure provides an advantage in enabling a machine tool including multiple systems to reduce an effect due to operation of another system to be exerted on operation of one system that executes a machining command, resulting in improvement of machining accuracy.

BRIEF DESCRIPTION OF DRAWINGS

FIG. 2 is a diagram illustrating an example of configuration of a control device according to the first embodiment.

FIG. 3 is a diagram illustrating an example of numerical control (NC) program associated with a system under monitoring.

FIG. 4 is a diagram illustrating an example of NC program associated with a speed-adjusted system.

DESCRIPTION OF EMBODIMENT

A control device and a machine tool control method according to an embodiment of the present disclosure will be described in detail below with reference to the drawings. Note that the embodiment described below is not intended to limit the technical scope of the present disclosure.

First Embodiment

Figure 1:
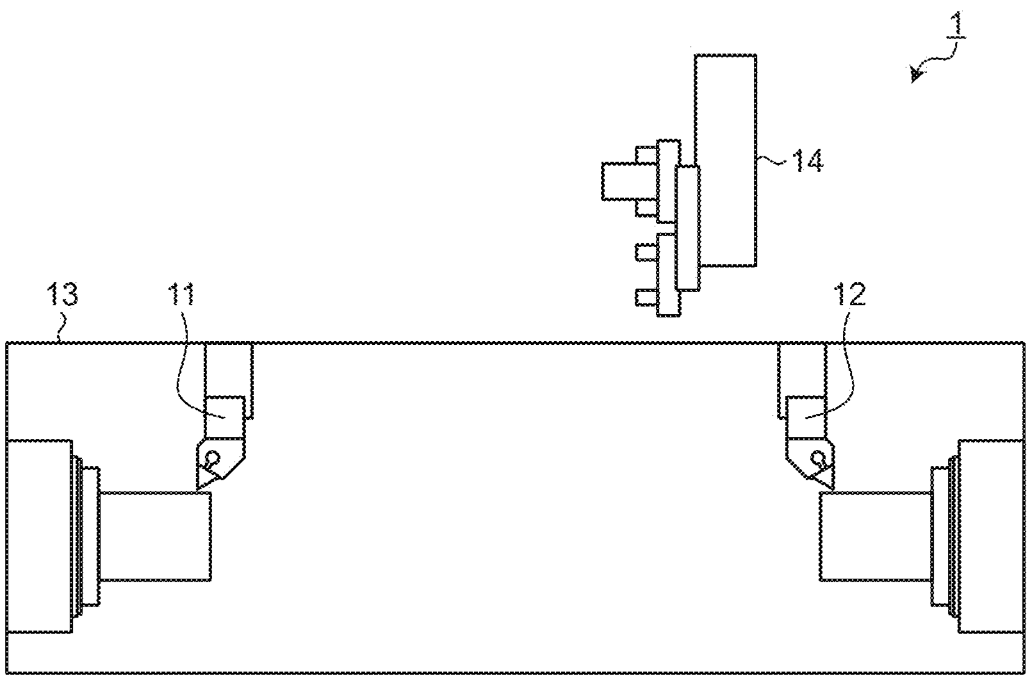
FIG. 1 is a diagram illustrating an example of configuration of a machine tool to be controlled in a first embodiment.

FIG. 1 is a diagram illustrating an example of configuration of a machine tool 1 to be controlled in a first embodiment. The machine tool 1 is, for example, a lathe. The machine tool 1 includes a tool 11 for machining a front surface of a workpiece, a tool 12 for machining a rear surface of the workpiece, and a carrying machine 14 which carries the workpiece into and out of a machining chamber 13.

In this example, machining of the front surface is an example of main machining process performed by the machine tool 1. The system that operates the tool 11 is an example of major system that performs a main machining process of the machine tool 1, and is referred to herein as first system. The system that operates the tool 12 and the system that operates the carrying machine 14 are minor systems, which perform machining processes other than the main machining process. The system that operates the tool 12 is referred to herein as second system, and the system that operates the carrying machine 14 is referred to herein as third system. The machine tool 1 includes multiple systems, which are the first system, the second system, and the third system.

FIG. 2 is a diagram illustrating an example of configuration of a control device 2 according to the first embodiment. The control device 2 is a numerical control device that controls the machine tool 1 according to numerical control (NC) programs 3-1 and 3-2. Specifically, the control device 2 is capable of controlling operation of the machine tool 1 by outputting commands to a drive unit 6 included in the machine tool 1, according to the NC programs 3-1 and 3-2. The NC programs 3-1 and 3-2 are also each called a machining program. The control device 2 is capable of obtaining information input from an operation panel 4, via a programmable logic controller (PLC) 5. The control device 2 includes a program analysis unit 21, a parameter storage unit 22, a shaft feeding speed determination unit 23, and a control unit 24.

Note that the drive unit 6 is an element to be controlled by the control device 2, and is included in the machine tool 1, though not illustrated in FIG. 1. FIG. 2 illustrates the drive unit 6 as a single function unit, but in fact, the drive unit 6 includes multiple sets of amplifiers, motors, and the like corresponding to the multiple respective systems included in the machine tool 1.

The control device 2 controls operation of the systems according to the multiple NC programs 3-1 and 3-2 associated with respective corresponding ones of the multiple systems included in the machine tool 1. This causes the feed shaft of each system of the machine tool 1 to move independently. The control device 2 also has functionality to adjust, on the basis of a situation of the operation of one system of the multiple systems included in the machine tool 1, a feed shaft moving speed of another system of the multiple systems included in the machine tool 1. This functionality is referred to herein as "inter-system speed override mode". In addition, the system that directs another system in the inter-system speed override mode is referred to herein as "system under monitoring", while the system that undergoes speed adjustment is referred to herein as "speed-adjusted system". Note that the speed-adjusted system is a system other than the system under monitoring. When the machine tool 1 includes three or more systems, all the systems other than the system under monitoring among the multiple systems included in the machine tool 1 may each be a speed-adjusted system, or part of the systems other than the system under monitoring may be a speed-adjusted system.

Note that the NC programs 3-1 and 3-2 are each an example of machining program describing operation of the machine tool 1. The NC program 3-1 is associated with the major system, and describes commands that provide instructions about, for example, a cutting feed speed, a movement amount of each shaft, start and end of the inter-system speed override mode, assignment of system-under-monitoring mode (hereinafter, monitored-system mode), an inter-system override mode range, and the like. In this respect, the cutting feed speed is a command value of the moving speed, in cutting machining, of the feed shaft included in the major system. The movement amount of each shaft is a command value of the movement amount of each shaft included in the major system. The monitored-system mode is an operation mode of operating as the system under monitoring during operation in the inter-system speed override mode. The inter-system override mode range is a range (i.e., a time period) in which the operation is performed in the inter-system override mode.

In addition, the NC program 3-2 is associated with the minor systems, and describes commands that provide instructions about, for example, a shaft feeding speed, a movement amount of each shaft, start and end of the inter-system speed override mode, assignment of speed-adjusted system mode, a speed override setting value, and the like. In this respect, the shaft feeding speed is a command value of the moving speed of the feed shaft included in a corresponding one of the minor systems. The movement amount of each shaft is a command value of the movement amount of each shaft included in the corresponding one of the minor systems. The speed-adjusted system mode is an operation mode of operating as a speed-adjusted system during operation in the inter-system speed override mode. The speed override setting value is a speed override setting value to be used during operation in the inter-system override mode. Note that the NC program 3-2 is input to the control device 2 as many as the number of the minor systems included in the machine tool 1.

The program analysis unit 21 analyzes the NC programs 3-1 and 3-2, and outputs an analysis result to the shaft feeding speed determination unit 23. Specifically, the program analysis unit 21 determines an inter-system speed override mode command, a monitored-system mode command, a speed-adjusted system mode command, and the like described in the NC programs 3-1 and 3-2, and outputs a determination result to the shaft feeding speed determination unit 23 as an analysis result. The program analysis unit 21 also outputs, as an analysis result, the movement amount of each shaft, the cutting feed speed, the shaft feeding speed, and the override setting value for use in the inter-system speed override mode commanded by the NC programs 3-1 and 3-2, to the shaft feeding speed determination unit 23.

The parameter storage unit 22 stores a fast-feeding feed speed that has been set by an NC parameter, and outputs the fast-feeding feed speed to the shaft feeding speed determination unit 23, where the fast-feeding feed speed is a shaft feeding speed to be used when a fast feed command is given in the NC programs 3-1 and 3-2. The parameter storage unit 22 is capable of storing, for example, a fast-feeding feed speed previously input from the outside of the control device 2.

The shaft feeding speed determination unit 23 determines a feed shaft moving speed, and outputs a shaft feeding speed command representing the feed shaft moving speed determined, to the control unit 24. The shaft feeding speed determination unit 23 can determine the feed shaft moving speed by multiplying a predetermined setting value or a command value described in the NC programs 3-1 and 3-2, of the feed speed, by a shaft feeding speed override setting value. The shaft feeding speed determination unit 23 can also adjust the feed shaft moving speed of a corresponding one of the speed-adjusted systems by changing the shaft feeding speed override setting value. The shaft feeding speed determination unit 23 receives a shaft feeding speed override setting value that has been input from the operation panel 4, via the PLC 5, and obtains the fast-feeding feed speed from the parameter storage unit 22. The shaft feeding speed determination unit 23 further obtains an analysis result from the program analysis unit 21. The shaft feeding speed determination unit 23 is capable of determining the feed shaft moving speed on the basis of information obtained. Specifically, the shaft feeding speed determination unit 23 is capable of determining the feed shaft moving speed in different methods depending on whether in the inter-system speed override mode or not, on the basis of the analysis result. When not in the inter-system speed override mode, the shaft feeding speed determination unit 23 can determine an ultimate shaft feeding speed on the basis of the shaft feeding speed override setting value obtained from the PLC 5 and the shaft feeding speed commanded by the NC programs 3-1 and 3-2. When in the inter-system speed override mode, the shaft feeding speed determination unit 23 determines the shaft feeding speed of the speed-adjusted system using the shaft feeding speed override setting value and the shaft feeding speed commanded by the NC program 3-2, rather than the shaft feeding speed override setting value obtained from the PLC 5.

The control unit 24 calculates a position command for each control time unit on the basis of the shaft feeding speed and the movement amount of each shaft that are output by the shaft feeding speed determination unit 23, and outputs the position command calculated to the drive unit 6.

Note that the program analysis unit 21, the shaft feeding speed determination unit 23, and the control unit 24 each perform the foregoing operation on each system to be driven. The position command is output correspondingly to each element to be driven.

An operation of the control device 2 will next be described using a specific example of the NC programs 3-1 and 3-2. In this example, FIG. 3 is a diagram illustrating an example of the NC program associated with the system under monitoring. FIG. 4 is a diagram illustrating an example of the NC program associated with the speed-adjusted system.

This example assumes that the first system, which is the major system described above, is the system under monitoring, and the third system, which is a minor system and operates the carrying machine 14, is the speed-adjusted system. In FIGS. 3 and 4, the symbol at the beginning of each line, such as "N01", is a sequence number representing the line number of that block. In each of the NC programs, commands described in the blocks are executed in order of the sequence numbers. The time required for processing a block differs from system to system, but wait commands are given at "N05" in FIGS. 3 and 4, thereby causing the command at "N06" of FIG. 3 and the command at "N06" of FIG. 4 to be executed simultaneously even when the processing time from "N01" to "N05" differs from system to system. The command "G177 P1" at "N06" of FIG. 3 is a command to start (or a start command of) the inter-system speed override mode. The option "P1" specifies that system as the system under monitoring. The command "G177 P2 J1 D20" at "N06" of FIG. 4 is also a command to start the inter-system speed override mode. The option "P2" specifies that system as the speed-adjusted system, "J1" specifies the first system as the system under monitoring, and "D20" specifies the shaft feeding speed override setting value as 20%. The command "G177 P0" at "N16" of FIG. 3 is a command to end (or an end command of) the inter-system speed override mode. In addition, the command "G177 P0" at "N19" of FIG. 4 is also a command to end the inter-system speed override mode. The speed-adjusted system operates with a shaft feeding speed of the speed-adjusted system that has been determined using the shaft feeding speed override setting value specified at "N06" of FIG. 4 during a time period from when the command to start the inter-system speed override mode was executed until the command to end the inter-system speed override mode is executed for the system under monitoring or for that system. In the illustrated example, the speed override setting value is changed from the usual operation value of 100% to 20% at "N07" and "N08" of FIG. 4. When the command at "N16" of FIG. 4 is executed, the command to end the inter-system speed override mode at "N16" of FIG. 3 has been executed for the system under monitoring, thereby causing the fast feed command at "N16" of FIG. 4 is executed with the speed override setting value returned to 100%. That is, when the command to end the inter-system speed override mode is executed for the system under monitoring, the inter-system speed override mode ends in the speed-adjusted system even before the end command is executed for the speed-adjusted system. Thus, the speed-adjusted system operates with the fast-feeding feed speed×100% at "N16" of FIG. 4 even though "N16" is before the command to end the inter-system speed override mode at "N19" of FIG. 4. Note that depending on the processing time of each block, the command at "N16" of FIG. 3 may not yet have been executed at the time of execution of the command at "N16" of FIG. 4. In this case, the fast feed command at "N16" of FIG. 4 is executed using a speed override setting value of "20%".

As described above, the speed override setting value is changed until the command to end the inter-system speed override mode is executed for either the system under monitoring or the speed-adjusted system. Thus, a start command and an end command can be written in the corresponding NC program to cause the system under monitoring to operate in the inter-system speed override mode during a time period of performing an operation preferably less affected by operation of the speed-adjusted system, such as, for example, finish machining. On the other hand, a start command and an end command can be written in the corresponding NC program to cause the speed-adjusted system to operate in the inter-system speed override mode during a time period of performing an operation that can affect the system under monitoring, such as, for example, an operation that may cause vibration in the system under monitoring, such as movement of the feed shaft. In this case, setting the speed override setting value in the inter-system speed override mode to a value less than the usual operation value of 100% can reduce the feed shaft moving speed of the speed-adjusted system to reduce the effect exerted on the system under monitoring caused by operation of the speed-adjusted system.

The command to end the inter-system speed override mode at "N16" of FIG. 3 and the command to start the inter-system speed override mode at "N06" of FIG. 3 together form a command set that specifies the time period of operation in the inter-system speed override mode. When the speed in the speed-adjusted system is made lower than the speed in a time period not in the inter-system speed override mode by starting such mode, this causes a decrease in productivity. However, specifying a particular time period for operation in the inter-system speed override mode can reduce the decrease in productivity.

Note that although a single system under monitoring is specified in relation to the speed-adjusted system in the example illustrated in FIG. 4, an NC program can specify multiple systems to be monitored. In this respect, a system under monitoring is not necessarily need to be the major system, but a minor system other than that system may be specified as the system under monitoring. In addition, the speed-adjusted system is not necessarily need to be a minor system, but the major system may be a speed-adjusted system. For example, to adjust the shaft feeding speed of another system using a shaft feeding speed override setting value during finish machining of a rear surface, this can be achieved by setting the second system as the system under monitoring, and setting the first and third systems as the speed-adjusted systems.

In the present embodiment, the shaft feeding speed override setting value for the speed-adjusted system in the inter-system speed override mode can be set only using a command value in the NC program, That is, when the shaft feeding speed determination unit 23 determines that the operation is in the inter-system speed override mode on the basis of the result of analysis of the NC program, the shaft feeding speed determination unit 23 determines the feed shaft moving speed using the shaft feeding speed override setting value described in the NC program. Even when an operation is performed to change the shaft feeding speed override setting value using the operation panel 4 during the inter-system speed override mode, the shaft feeding speed determination unit 23 uses no value other than the shaft feeding speed override setting value described in the NC program. Namely, the shaft feeding speed determination unit 23 does not use any value such as a shaft feeding speed override setting value that has been input from the operation panel 4 and obtained via the PLC 5, other than the shaft feeding speed override setting value described in the NC program. This eliminates a need for an operator to perform, among others, operation for changing the shaft feeding speed override setting value during the inter-system speed override mode. In addition, even when the operator mistakenly performs an operation of changing the shaft feeding speed override setting value using the operation panel 4, the shaft feeding speed of the speed-adjusted system will not be changed, Thus, steps to be performed by the operator can be saved such as determination of the shaft feeding speed override setting value and inputting of the determined value. Moreover, a situation can be prevented from occurring of decreasing in machining accuracy caused by an incorrect operation.

Note that, in the dedicated command set for implementing the functionality described in the present embodiment, a "P address" can be used to select whether the system associated with that NC program is to operate in the monitored-system mode or in the speed-adjusted system mode. Then, when the speed-adjusted system mode is selected, a "J address" specifies the system under monitoring, and a "D address" commands the shaft feeding speed override setting value to be used in the inter-system speed override mode. In this case, multiple systems can be specified using a "J address" such as "J1J2" to specify multiple systems each as the system under monitoring. The parameter "J1J2" means that the first system and the second system are each specified as the system under monitoring. In this manner, by offering a dedicated programming command set that allows changing of the shaft feeding speed override setting value of another system, machining accuracy can be improved, and decrease in productivity can be reduced while burden on the operator for speed adjustment is reduced.

A hardware configuration of the control device 2 according to the first embodiment will next be described. The program analysis unit 21, the parameter storage unit 22, the shaft feeding speed determination unit 23, and the control unit 24 of the control device 2 are implemented using processing circuitry. The processing circuitry may be implemented by a dedicated hardware element, or may be a control circuit using a central processing unit (CPU).

Figure 5:
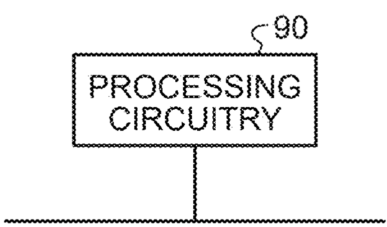
FIG. 5 is a diagram illustrating a dedicated hardware element for implementing functionality of the control device according to the first embodiment.

When the aforementioned processing circuitry is implemented by a dedicated hardware element, these are implemented using processing circuitry 90 illustrated in FIG. 5. FIG. 5 is a diagram illustrating a dedicated hardware element for implementing the functionality of the control device 2 according to the first embodiment. The processing circuitry 90 is a single circuit, a set of multiple circuits, a programmed processor, a parallel programmed processor, an application specific integrated circuit (ASIC), a field programmable gate array (FPGA), or a combination thereof.

Figure 6:
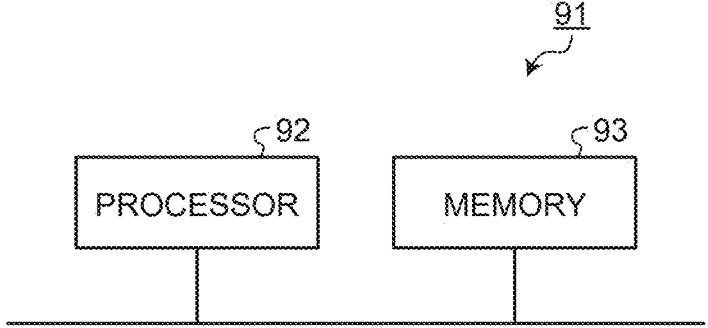
FIG. 6 is a diagram illustrating a configuration of a control circuit for implementing functionality of the control device according to the first embodiment.

When the aforementioned processing circuitry is implemented by a control circuit using a CPU, this control circuit is, for example, a control circuit 91 configured as illustrated in FIG. 6. FIG. 6 is a diagram illustrating a configuration of the control circuit 91 for implementing the functionality of the control device 2 according to the first embodiment. As illustrated in FIG. 6, the control circuit 91 includes a processor 92 and a memory 93. The processor 92 is a CPU, which is also known as a processing unit, a computing unit, a microprocessor, a microcomputer, a digital signal processor (DSP), and the like. The memory 93 is, for example, a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disk (DVD), or the like.

When the aforementioned processing circuitry is implemented by the control circuit 91, functionality is provided in such a manner that the processor 92 reads and executes a program associated with processing of each component, stored in the memory 93. The memory 93 is also used as a temporary memory for processing performed by the processor 92. Note that the program to be executed by the processor 92 may be provided as stored in a storage medium or provided via a communication channel such as the Internet.

As described above, the control device 2 according to the first embodiment is a control device 2 that causes multiple systems included in the machine tool 1 to operate independently of each other according to the NC programs 3-1 and 3-2, which are multiple machining programs associated with respective corresponding ones of the multiple systems. The control device 2 includes the shaft feeding speed determination unit 23, which when one of the multiple systems is set as a system under monitoring, adjusts a feed shaft moving speed of a speed-adjusted system, which is another one of the systems other than the system that has been set as the system under monitoring, Such configuration enables the control device 2 to adjust the feed shaft moving speed of another one of the multiple systems included in the machine tool 1 on the basis of ongoing operation of the one system. In the machine tool 1 including multiple systems, the feed shaft moving speed of one of the multiple systems may affect operation of another system. For example, when the feed shaft is being moved, for example, a workpiece is being carried by a gantry loader, in one system while machining requiring high machining accuracy such as finish machining is being performed in another system, vibration caused by a carrying operation may reduce machining accuracy. For example, reduction of the feed shaft moving speed in another system during a time period in which finish machining is performed, to a value less than the value during a time period in which finish machining is not performed can reduce or prevent occurrence of vibration, and can thus improve machining accuracy. In addition, during an operation having no effect on machining accuracy, use of a higher feed shaft moving speed can increase productivity.

Also in this respect, stopping the operation of the another system will no longer cause vibration, but will reduce productivity instead. Accordingly, the feed shaft moving speed of the speed-adjusted system is desirably set to a positive value, and lower during a time period of operation in the inter-system speed override mode than in other time periods. This can reduce a decrease in productivity.

In addition, the shaft feeding speed determination unit 23 determines the feed shaft moving speed by multiplying a predetermined setting value or a command value described in the machining program, of the feed speed, by a shaft feeding speed override setting value, and adjusts the feed shaft moving speed of the speed-adjusted system by changing the shaft feeding speed override setting value. The shaft feeding speed determination unit 23 is also capable of adjusting the feed shaft moving speed of the speed-adjusted system using the shaft feeding speed override setting value described in the machining program. Describing, in the NC program 3-2, the shaft feeding speed override setting value to be used during the inter-system speed override mode enables the feed shaft moving speed of the speed-adjusted system to be adjusted without necessity for the operator to work to adjust the shaft feeding speed override setting value.

When the machining program associated with one of the multiple systems describes a start command that commands starting of the inter-system speed override mode, the shaft feeding speed determination unit 23 adjusts, according to the start command, the feed shaft moving speed of the speed-adjusted system using the override setting value described in the machining program, where the inter-system speed override mode is an operation mode of adjusting the feed shaft moving speed of the speed-adjusted system on the basis of the operational state of the system under monitoring. In addition, when the machining program associated with the system under monitoring describes a command set that specifies the time period of operation in the inter-system speed override mode, the shaft feeding speed determination unit 23 adjusts the feed shaft moving speed of the speed-adjusted system for the time period specified by that command set. This enables specification, in the NC program, of the time period of operation in the inter-system speed override mode and of providing speed adjustment, and thereby enables the speed adjustment to be provided only during a particular time period. This accordingly enables a speed reduction to be provided only for a minimum time period, and unnecessary decrease in productivity to be reduced or prevented.

The shaft feeding speed determination unit 23 is further capable of adjusting the feed shaft moving speed of each of multiple speed-adjusted systems on the basis of ongoing operation of the system under monitoring. Ability of specifying multiple systems in which speed adjustment is to be provided enables the speed adjustment to be appropriately provided even in the machine tool 1 configured to include three or more systems.

Moreover, when the system that has been set as the system under monitoring is affected due to operation of the speed-adjusted system, the shaft feeding speed determination unit 23 is capable of reducing the feed shaft moving speed of that speed-adjusted system. This can reduce the effect exerted on the system under monitoring caused by operation of the speed-adjusted system.

The configurations described in the foregoing embodiment are merely examples. These configurations can be combined with another known technology, and part of such configurations can be omitted and/or modified without departing from the spirit.

For example, the machine tool 1 has been described in the foregoing example as including three systems, but what is needed for the machine tool 1 is to include multiple systems, and the machine tool 1 may therefore include two systems or four or more systems. Furthermore, although the foregoing example has been described in which the control device 2 is a device separate from the machine tool 1, the control device 2 may be incorporated in the machine tool 1.

REFERENCE SIGNS LIST

1 machine tool; 2 control device; 3-1, 3-2 NC program; 4 operation panel; 5 PLC; 6 drive unit; 11, 12 tool; 13 machining chamber; 14 carrying machine; 21 program analysis unit; 22 parameter storage unit; 23 shaft feeding speed determination unit; 24 control unit; 90 processing circuitry; 91 control circuit; 92 processor; 93 memory.

The invention claimed is:

1. A control device that causes a plurality of systems included in a machine tool to operate independently of each other according to a plurality of machining programs associated with the plurality of respective systems, the control device comprising:

shaft feeding speed determination circuitry to adjust a feed shaft moving speed of a speed-adjusted system by multiplying a feed speed by an override setting value described in an applicable one of the machining programs associated with the speed-adjusted system, the speed-adjusted system being one of the systems in which the feed shaft moving speed is adjusted on a basis of an operational state of a system under monitoring, when one of the plurality of systems is set as the system under monitoring by a command described in an applicable one of the machining programs associated with the one of the systems, and another one of the systems other than the system that has been set as the system under monitoring is set as the speed-adjusted system by a command described in the applicable one of the machining programs associated with the another one of the systems.

2. The control device according to claim 1, wherein the shaft feeding speed determination circuitry determines the feed shaft moving speed by multiplying a predetermined setting value or a command value described in an applicable one of the machining programs, of a feed speed, by the override setting value, and adjusts the feed shaft moving speed of the speed-adjusted system by changing the override setting value.

3. The control device according to claim 1, wherein when one of the machining programs associated with one of the plurality of systems describes a start command that commands starting of an inter-system speed override mode, the shaft feeding speed determination circuitry adjusts, according to the start command, the feed shaft moving speed of the speed-adjusted system using the override setting value, the override setting value being described in an applicable one of the machining programs, the inter-system speed override mode being an operation mode of adjusting the feed shaft moving speed of the speed-adjusted system on a basis of an operational state of the system under monitoring.

4. The control device according to claim 3, wherein when one of the machining programs associated with the system under monitoring describes a command set that specifies a time period of operation in the inter-system speed override mode, the shaft feeding speed determination circuitry adjusts the feed shaft moving speed of the speed-adjusted system for the time period specified by that command set.

5. The control device according to claim 1, wherein the shaft feeding speed determination circuitry adjusts the feed shaft moving speed of each of multiple ones of the speed-adjusted system on a basis of ongoing operation of the system under monitoring.

6. The control device according to claim 1, wherein when the system that has been set as the system under monitoring is affected due to operation of the speed-adjusted system, the shaft feeding speed determination circuitry reduces the feed shaft moving speed of that speed-adjusted system.

7. A machine tool control method for controlling a machine tool, to be implemented by a control device that causes a plurality of systems included in the machine tool to operate independently of each other according to a plurality of machining programs associated with the plurality of respective systems, the machine tool control method comprising:

adjusting a feed shaft moving speed of a speed-adjusted system by multiplying a feed speed by an override setting value described in an applicable one of the machining programs associated with the speed-adjusted system, the speed-adjusted system being one of the systems in which the feed shaft moving speed is adjusted on a basis of an operational state of a system under monitoring, when one of the plurality of systems is set as the system under monitoring by a command described in an applicable one of the machining programs associated with the one of the systems, and another one of the systems other than the system that has been set as the system under monitoring is set as the speed-adjusted system by a command described in the applicable one of the machining programs associated with the another one of the systems.

* * * * *